(12) United States Patent
Wang et al.

(10) Patent No.: US 12,387,044 B2
(45) Date of Patent: Aug. 12, 2025

(54) NATURAL LANGUAGE PROCESSING METHOD AND APPARATUS, DEVICE, AND READABLE STORAGE MEDIUM USING A THREE DIMENSIONAL TENSOR TO DETERMINE A RELATION BETWEEN ENTITIES TO AID IN A QUESTION-ANSWERING TASK

(71) Applicant: SUZHOU METABRAIN INTELLIGENT TECHNOLOGY CO., LTD., Jiangsu (CN)

(72) Inventors: Li Wang, Jiangsu (CN); Yaqian Zhao, Jiangsu (CN); Baoyu Fan, Jiangsu (CN); Rengang Li, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/696,336

(22) PCT Filed: Jun. 30, 2022

(86) PCT No.: PCT/CN2022/102862
§ 371 (c)(1),
(2) Date: Mar. 27, 2024

(87) PCT Pub. No.: WO2023/130688
PCT Pub. Date: Jul. 13, 2023

(65) Prior Publication Data
US 2024/0338524 A1 Oct. 10, 2024

(30) Foreign Application Priority Data
Jan. 5, 2022 (CN) .......................... 202210002872.6

(51) Int. Cl.
*G06F 40/295* (2020.01)
*G06F 16/28* (2019.01)
(Continued)

(52) U.S. Cl.
CPC .......... *G06F 40/295* (2020.01); *G06F 16/367* (2019.01); *G06F 16/288* (2019.01); *G06N 20/00* (2019.01)

(58) Field of Classification Search
CPC ............................. G06N 20/00; G06F 16/288
(Continued)

(56) References Cited

U.S. PATENT DOCUMENTS

| 6,374,209 B1 | 4/2002 | Yoshimi et al. |
| 11,442,992 B1 * | 9/2022 | Moon ..................... G06N 20/00 |

(Continued)

FOREIGN PATENT DOCUMENTS

| CA | 3167569 | * 4/2021 | ............. G06N 20/00 |
| CN | 109522553 A | 3/2019 | |

(Continued)

OTHER PUBLICATIONS

Corresponding International Patent Application No. PCT/CN2022/102862, International Search Report, Date Mailed Sep. 7, 2022.
(Continued)

*Primary Examiner* — Farzad Kazeminezhad
(74) *Attorney, Agent, or Firm* — Cooper Legal Group, LLC (57) ABSTRACT

A natural language processing method and apparatus, a device, and a readable storage medium, where the method includes: obtaining a target sentence to be processed, and determining each entity in the target sentence (S101); for each entity in the target sentence, in response to the entity being present in a preset entity set, determining extended information for the entity, and adding the determined
(Continued)

extended information after a location of the entity in the target sentence, to obtain an updated target sentence (S102); and inputting the updated target sentence to a bidirectional encoder representations from transformer (BERT) model, such that the BERT model performs a natural language processing task, where in a process in which the BERT model performs the natural language processing task, an attention score between extended information of any entity in the target sentence and another entity in the target sentence is adjusted to zero (S103).

16 Claims, 2 Drawing Sheets

(51) Int. Cl.
  *G06F 16/36* (2019.01)
  *G06N 20/00* (2019.01)
(58) Field of Classification Search
  USPC .............................................................. 704/9
  See application file for complete search history.

(56) References Cited

U.S. PATENT DOCUMENTS

| | | | | |
|---|---|---|---|---|
| 11,615,246 | B2* | 3/2023 | Reisswig | G06F 16/367 704/9 |
| 2018/0336466 | A1 | 11/2018 | Braun et al. | |
| 2018/0365226 | A1* | 12/2018 | Ezen Can | G06N 5/043 |
| 2021/0081717 | A1* | 3/2021 | Creed | G06N 5/022 |

FOREIGN PATENT DOCUMENTS

| | | | | |
|---|---|---|---|---|
| CN | 111274794 | A | 6/2020 | |
| CN | 111523534 | A * | 8/2020 | ........... G06F 40/284 |
| CN | 111813954 | A | 10/2020 | |
| CN | 112270196 | A | 1/2021 | |
| CN | 112507715 | A | 3/2021 | |
| CN | 112989024 | A | 6/2021 | |
| CN | 113158653 | A | 7/2021 | |
| CN | 113434699 | A | 9/2021 | |
| CN | 113627192 | A | 11/2021 | |
| CN | 113705237 | A | 11/2021 | |
| CN | 113779185 | A | 12/2021 | |
| CN | 114021572 | A | 2/2022 | |
| KR | 20210040319 | A | 4/2021 | |
| WO | 2021169745 | A1 | 9/2021 | |

OTHER PUBLICATIONS

Corresponding International Patent Application No. PCT/CN2022/102862, Written Opinion, Date Mailed Sep. 7, 2022.
Corresponding Chinese Patent Application No. CN202210002872.6, First Office Action, date mailed Feb. 17, 2022.
Corresponding Chinese Patent Application No. CN202210002872.6, Notice of Grant, date mailed Feb. 25, 2022.
Youngbin Ro, et al., "Multi2OIE: Multilingual Open Information Extraction based on Multi-Head Attention with BERT", atarXiv:2009.08128, Sep. 17, 2020, vol. 1, p. 1-11.
Mao, Mingyi, et al, "Bert Named Entity Recognition Model With Self-Attention Mechanism", CAAI Transactions on Intelligent Systems, Jul. 31, 2020, pp. 772-779, vol. 15, No. 4. with English Abstract.
Sun, Yi, et., "Knowledge Enhancement for Pre-Trained Language Models: A Survey", A Journal of Chinese Information Proccessing, Jul. 2021, pp. 10-29, vol. 35, No. 7. with English Abstract.

* cited by examiner

NATURAL LANGUAGE PROCESSING METHOD AND APPARATUS, DEVICE, AND READABLE STORAGE MEDIUM USING A THREE DIMENSIONAL TENSOR TO DETERMINE A RELATION BETWEEN ENTITIES TO AID IN A QUESTION-ANSWERING TASK

CROSS-REFERENCE TO RELATED APPLICATIONS

This application claims priority to Chinese Patent Application No. CN202210002872.6, filed with the China National Intellectual Property Administration on Jan. 5, 2022 and entitled "NATURAL LANGUAGE PROCESSING METHOD AND APPARATUS, DEVICE, AND READABLE STORAGE MEDIUM", which is incorporated herein by reference in its entirety.

FIELD

The present application relates to the field of computer technologies, and in particular, to a natural language processing method and apparatus, a device, and a readable storage medium.

BACKGROUND

Currently, related information may be extended for input data of a bidirectional encoder representations from transformer (BERT) model. However, the extended information may affect determination of the input data by the model, resulting in a reduced accuracy of a processing result. Currently, accuracy of selecting the extended information is improved by various strategies. However, adverse impact of the extended information on the original input data still cannot be effectively reduced.

SUMMARY

According to a first aspect, an embodiment of the present application provides a natural language processing method, including:
  obtaining a target sentence to be processed, and determining each entity in the target sentence;
  for each entity in the target sentence, in response to the entity being present in a preset entity set, determining extended information for the entity, and adding the determined extended information after a location of the entity in the target sentence, to obtain an updated target sentence; and
  inputting the updated target sentence to a BERT model, such that the BERT model performs a natural language processing task.

In a process in which the BERT model performs the natural language processing task, an attention score between extended information of any entity in the target sentence and another entity in the target sentence is tuned to zero.

In some embodiments, the determining extended information for the entity includes:
  taking the entity as a target object, and determining, in the preset entity set, an entity group in relation with the target object; and
  selecting, from the entity group, an entity which a relation probability value greater than a first threshold, and generating extended information of the target object based on the selected entity.

In some embodiments, the determining, in the preset entity set, the entity group in relation with the target object includes:
  generating an N×N×M-dimensional tensor for representing a relation and a relation probability value between entities in the preset entity set, where N represents a quantity of entities included in the preset entity set, and M represents a quantity of relations between different entities in the preset entity set; and
  generating a knowledge graph based on the N×N×M-dimensional tensor, and querying, in the knowledge graph, the entity group in relation with the target object.

In some embodiments, the generating the N×N×M-dimensional tensor for representing the relation and the relation probability value between entities in the preset entity set includes:
  generating an initial tensor that is all-0 in N×N×M dimensions;
  obtaining a sentence library for generating the preset entity set, traversing each sentence in the sentence library, and taking the traversed sentence as a sentence to be recognized;
  taking two adjacent entities in the sentence to be recognized as an entity group, to obtain a plurality of entity groups;
  recognizing the relation between two entities in each entity group by using a relation recognition model, to obtain a plurality of M-dimensional relation vectors;
  for each M-dimensional relation vector, in response to a maximum value in any M-dimensional relation vector being greater than a second threshold, updating an element at a location, in the initial tensor, which corresponds to the maximum value, from 0 to 1, to update the initial tensor; and
  traversing and updating a next sentence in the sentence library, and after each sentence in the sentence library is traversed, outputting and optimizing a currently obtained tensor to obtain the N×N×M-dimensional tensor.

In some embodiments, the recognizing the relation between two entities in each entity group by using the relation recognition model, to obtain the plurality of M-dimensional relation vectors includes:
  for two entities in any entity group, replacing the two entities in the sentence to be recognized with different identifiers, and inputting the replaced sentence to the relation recognition model, such that the relation recognition model outputs an M-dimensional relation vector corresponding to the two entities.

In some embodiments, the optimizing the currently obtained tensor to obtain the N×N×M-dimensional tensor includes:
  forming an initial three-dimensional matrix with the currently obtained tensor, and decomposing the initial three-dimensional matrix into M pieces of N×N-dimensional matrices $X_i$, where $i=1, 2, \ldots, M$;
  decomposing a d×d×M-dimensional tensor O through initialization into M pieces of d×d-dimensional matrices $O_i$, where d represents an adjustable hyper-parameter;
  obtaining an N×d-dimensional matrix A through initialization, and calculating optimal A' and M pieces of optimal Oi' based on $X_i = A O_i A^T$ and a gradient descent method;
  obtaining a new three-dimensional matrix based on the optimal A' and the M pieces of optimal Oi'; and comparing the initial three-dimensional matrix with the new three-dimensional matrix bit by bit based on a max function, and reserving a maximum value at each location, to obtain the N×N×M-dimensional tensor.

In some embodiments, the relation recognition model includes a sub-model of a transformer structure and a relation classification neural network. The inputting the replaced sentence to the relation recognition model, such that the relation recognition model outputs the M-dimensional relation vector corresponding to the two entities includes:

inputting the replaced sentence to the sub-model of the transformer structure, to obtain a feature vector with the identifiers of the two entities; and inputting the feature vector with the identifiers of the two entities to the relation classification neural network, to obtain the M-dimensional relation vector corresponding to the two entities.

In some embodiments, the determining extended information for the entity includes:

taking the entity as a target object, and determining, in the preset entity set, an object entity in maximum correlation with the target object, where the object entity is another entity in the preset entity set except the target entity; and generating extended information of the target object based on the object entity in maximum correlation with the target object.

In some embodiments, the determining, in the preset entity set, the object entity in maximum correlation with the target object includes:

determining a maximum relation probability value of the target object relative to each object entity, to obtain N-1 pieces of maximum relation probability values, where N-1 represents a quantity of object entities, and N represents a quantity of entities included in the preset entity set;

determining a correlation between each object entity and the target sentence, to obtain N-1 pieces of correlations;

for each object entity, calculating a product of the correlation corresponding to the object entity and the maximum relation probability value corresponding to the object entity, to obtain a correlation score corresponding to the object entity to obtain N-1 pieces of correlation scores; and taking an object entity corresponding to a maximum correlation score in the N-1 pieces of correlation scores as the object entity in maximum correlation with the target object.

In some embodiments, the determining the correlation between each object entity and the target sentence includes:

for each object entity, determining a sum of a correlation degree between each entity in the target sentence and the object entity as the correlation between the object entity and the target sentence.

In some embodiments, the correlation degree between each entity in the target sentence and the object entity is a maximum relation probability value of the any entity in the target sentence relative to the object entity plus a maximum relation probability value of the object entity relative to the entity.

In some embodiments, the natural language processing method further includes:

in the process in which the BERT model performs the natural language processing task, tuning an attention score between extended information of any entity in the target sentence and the entity to a target value, where the target value is a sum of the attention score between the extended information and the entity and InY, Y represents a value at a corresponding location in the N×N×M-dimensional tensor, and the N×N×M-dimensional tensor is used to represent the relation and the relation probability value between the entities in the preset entity set.

In some embodiments, the attention score between the extended information of the any entity in the target sentence and the another entity includes an attention score between each word in the extended information of the entity and each word in the another entity.

According to a second aspect, an embodiment of the present application provides a natural language processing apparatus, including:

an obtaining module, configured to obtain a target sentence to be processed, and determine each entity in the target sentence;

an extension module, configured to: for each entity in the target sentence, in response to the entity being present in a preset entity set, determine extended information for the entity, and add the determined extended information after a location of the entity in the target sentence, to obtain an updated target sentence; and a processing module, configured to input the updated target sentence to a BERT model, such that the BERT model performs a natural language processing task, where in a process in which the BERT model performs the natural language processing task, an attention score between extended information of any entity in the target sentence and another entity in the target sentence is tuned to zero.

According to a third aspect, an embodiment of the present application provides an electronic device, including:

a memory, configured to store computer-readable instructions; and a processor, configured to execute the computer-readable instructions, to implement the natural language processing method according to any foregoing embodiment.

According to a fourth aspect, an embodiment of the present application provides one or more non-volatile computer-readable storage media storing computer-readable instructions, characterized in that when the computer-readable instructions are executed by one or more processors, the one or more processors are enabled to perform the steps of the natural language processing method according to any foregoing embodiment.

BRIEF DESCRIPTION OF THE DRAWINGS

To describe the technical solutions in embodiments of the present application or the related art more clearly, the following briefly describes the accompanying drawings required for describing the embodiments or the related art. It is clear that the accompanying drawings in the following description show merely the embodiments of the present application, and a person of ordinary skill in the art may still derive other drawings from the provided accompanying drawings without creative efforts.

DETAILED DESCRIPTION

The following clearly and completely describes the technical solutions in the embodiments of the present application with reference to the accompanying drawings in the embodiments of the present application. It is clear that the described embodiments are merely some but not all of the embodiments of the present application. All other embodiments obtained by a person of ordinary skill in the art based on the embodiments of the present application without creative efforts shall fall within the protection scope of the present application.

Currently, additional knowledge may be introduced to an input to achieve a purpose of enhancing a BERT model. A knowledge graph stores structural information, and thus is a best source for knowledge extraction.

The knowledge graph is a knowledge system formed by structuring human knowledge, includes basic facts, general rules, and other related structured information, and can be used for intelligent tasks of information retrieval, inference decision, and the like. Rich information included in the knowledge graph can assist the BERT model in better performing a natural language processing task. The knowledge graph is constructed, and information in the knowledge graph is added to the input of the BERT model as additional information, so that the BERT model can be assisted in performing the natural language processing task.

However, some knowledge graphs focus on only a surface relation of a text, but ignore a potential relation that may exist. In addition, adding the information in the knowledge graph to the input of the BERT model is likely to bring excessive noise (low-relevance information), affecting efficiency and effects.

Currently, related information may be extended for input data of the BERT model. However, the extended information may affect determining of the input data by the model, reducing accuracy of a processing result. Currently, accuracy of selecting the extended information is improved by various strategies. However, adverse impact of the extended information on the original input data still cannot be effectively reduced. In view of this, the present application provides a natural language processing solution, to effectively reduce the adverse impact of the extended information on the original input data.

Figure 1:
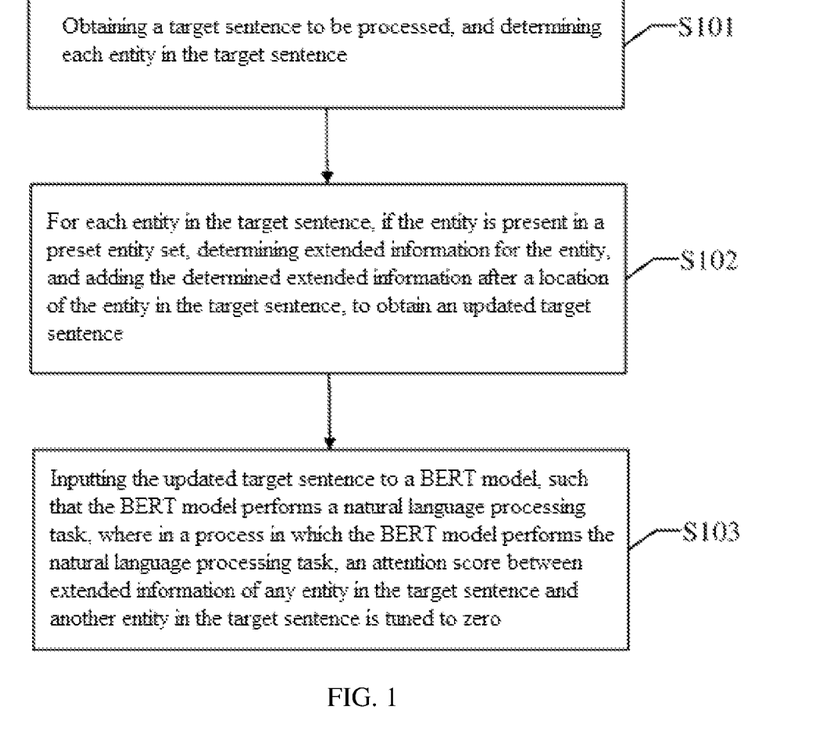
FIG. 1 is a flowchart of a natural language processing method according to one or more embodiments.

As shown in FIG. 1, an embodiment of the present application discloses a natural language processing method, including step S101, step S102, and step S103.

In step S101, a target sentence to be processed is obtained, and each entity in the target sentence is determined.

In this embodiment, a noun in the target sentence is categorized as an entity. The target sentence includes at least one entity. For example, a sentence "小明管理的 A 公司经营着服装业务 (Company A managed by Xiaoming runs a clothing business)" includes three entities: 小明 (Xiaoming), A 公司 (Company A), and 服装业务 (clothing business).

In step S102, for each entity in the target sentence, if the entity is present in a preset entity set, extended information is determined for the entity, and the determined extended information is added after a location of the entity in the target sentence, to obtain an updated target sentence.

Step S102 may include: for each entity in the target sentence, in response to the entity being present in the preset entity set, the extended information is determined for the entity, and the determined extended information is added after the location of the entity in the target sentence, to obtain the updated target sentence.

It should be noted that the preset entity set is a set of numerous entities. If an entity in the target sentence is present in the preset entity set, it indicates that another entity in correlation with the entity may be found from the preset entity set. In this case, extended information may be determined for the entity accordingly, and the determined extended information is added after a location of the entity in the target sentence, to add the extended information for the entity. Accordingly, extended information may be added for each entity that is in the target sentence and is present in the preset entity set, and then the updated target sentence may be obtained. No extended information is added for an entity that is in the target sentence but is not present in the preset entity set.

It is assumed that the target sentence is "小明创立 A 公司 (Xiaoming sets up Company A)". Extended information added for an entity "小明 (Xiaoming)" "是中国 人 (is Chinese)", where "中国人 (Chinese)" is an entity in the preset entity set. Extended information added for an entity "A 公司 (Company A)" is "经营服装业务 (running a clothing business)", where "服装业务 (clothing business)" is an entity in the preset entity set. In this case, a finally obtained updated target sentence is "小明是 中国人创立 A 公司经营服装业务 (Xiaoming is Chinese, and sets up Company A running a clothing business)", where "是 (is)" is a relational term that connects "小明 (Xiaoming)" and "中国人 (Chinese)", and "经营 (running)" is a relational term that connects "A 公司 (Company A)" and "服装业务 (clothing business)". Such relational words may be determined according to idiomatic phrases.

In step S103, the updated target sentence is input to a BERT model, such that the BERT model performs a natural language processing task, where in a process in which the BERT model performs the natural language processing task, an attention score between extended information of any entity in the target sentence and another entity in the target sentence is tuned to zero.

It should be noted that the BERT model includes a self-attention layer. The self-attention layer may calculate an attention score between different words in a sentence. In this embodiment, tuning an attention score between extended information of an entity and another entity in the target sentence to zero can avoid an attention score between unrelated information providing wrong information for a subsequent processing process, so that adverse impact of extended information on original input data can be reduced.

In this embodiment, the updated target sentence is used as input data of the BERT model, so that the BERT model can obtain more information as much as possible when performing the natural language processing task. Therefore, processing accuracy and effects can be improved. If the BERT model processes a question answering task, after obtaining a question, the BERT model may add extended information for each entity in the question according to this embodiment, to update the question. After a new question is obtained through updating, the new question is processed, to determine a best answer to the new question.

Moreover, in this embodiment, extended information may be added for each entity in the target sentence, so that effective information may be extended for the target sentence that is used as the input data of the BERT model. In addition, in the process in which the BERT model performs the natural language processing task, the attention information between the extended information of the any entity in the target sentence and the another entity in the target sentence is tuned to zero, so that an attention score between the added information and unrelated information in the original sentence is zero. This can avoid influence between unrelated information, thereby effectively reducing the adverse impact of the extended information on the original input data, improving processing accuracy of the BERT model in the natural language processing task, and improving the processing efficiency and processing effects of the BERT model.

For example, the original target sentence is "小明创立A公司 (Xiaoming sets up Company A)", and the updated target sentence is "小明是中国人创立A公司经营服 装业务 (Xiaoming is Chinese and sets up Company A running a clothing business)". Herein, "是中国人 (is Chinese)" is extended information of "小明 (Xiaoming)", and is unrelated to "创立A公司 (sets up Company A)" in the original sentence, so that an attention score between each word in "是中国人 (is Chinese)" and each word in "创 立A公司 (sets up Company A)" is tuned to zero, to reduce adverse impact of "是中 国人 (is Chinese)" on "创立A公司 (sets up Company A)" in the original sentence. Accordingly," 经营服装业务 (running a clothing business)" is extended information of "A 公司 (Company A)", and is unrelated to "小明 (Xiaoming)" in the original sentence, so that an attention score between each word in "经营服装业务 (running a clothing business)" and each word in "小明 (Xiaoming)" is tuned to zero, to reduce adverse impact of "经营服装业务 (running a clothing business)" on "小明 (Xiaoming)" in the original sentence.

In an implementation, the extended information is determined for the entity includes: the entity is used as a target object, and an entity group in relation with the target object is determined in the preset entity set; and an entity which relation probability value greater than a first threshold is selected from the entity group, and extended information of the target object is generated based on the selected entity.

In an implementation, the entity group in relation with the target object is determined in the preset entity set includes: an N×N×M-dimensional tensor for representing a relation and a relation probability value between entities in the preset entity set is generated. N represents a quantity of entities included in the preset entity set. M represents a quantity of relations between different entities in the preset entity set. A knowledge graph is generated based on the N×N×M-dimensional tensor, and the entity group in relation with the target object is queried in the knowledge graph. The N×N×M-dimensional tensor is equivalent to the knowledge graph. Therefore, generating the knowledge graph based on the N×N×M-dimensional tensor is just representing related information in the tensor in a manner of the knowledge graph.

It can be learned that the entity group in relation with the target object can be obtained through querying in the knowledge graph.

In an implementation, the N×N×M-dimensional tensor for representing a relation and a relation probability value between entities in the preset entity set is generated includes: an initial tensor that is all-0 in N×N×M dimensions is generated. A sentence library for generating the preset entity set is obtained, each sentence in the sentence library is traversed, and the traversed sentence is used as a sentence to be recognized. Two adjacent entities in the sentence to be recognized are used as an entity group, to obtain a plurality of entity groups. A relation between two entities in each entity group is recognized by using a relation recognition model, to obtain a plurality of M-dimensional relation vectors. For each M-dimensional relation vector, if a maximum value in any M-dimensional relation vector is greater than a second threshold, an element at a location, in the initial tensor, which corresponds to the maximum value, is updated from 0 to 1, to update the initial tensor. A next sentence in the sentence library is traversed and updated. After each sentence in the sentence library is traversed, elements at some locations in the all-0 initial tensor may be changed to 1, while elements at some locations remain 0, so that a tensor including 0 and 1 is obtained. The currently obtained tensor including 0 and 1 is simultaneously optimized, to obtain the N×N×M-dimensional tensor.

For each M-dimensional relation vector, if a maximum value in any M-dimensional relation vector is greater than the second threshold, the element at a location, in the initial tensor, which corresponds to the maximum value, is updated from 0 to 1 includes: for each M-dimensional relation vector, in response to a maximum value in any M-dimensional relation vector being greater than the second threshold, an element at a location, in the initial tensor, which corresponds to the maximum value, is updated from 0 to 1, to update the initial tensor.

In an implementation, the relation between two entities in each entity group is recognized by using a relation recognition model, to obtain a plurality of M-dimensional relation vectors includes: for two entities in any entity group, the two entities in the sentence to be recognized are replaced with different identifiers, and a replaced sentence is input to the relation recognition model, such that the relation recognition model outputs an M-dimensional relation vector corresponding to the two entities.

Figure 2:
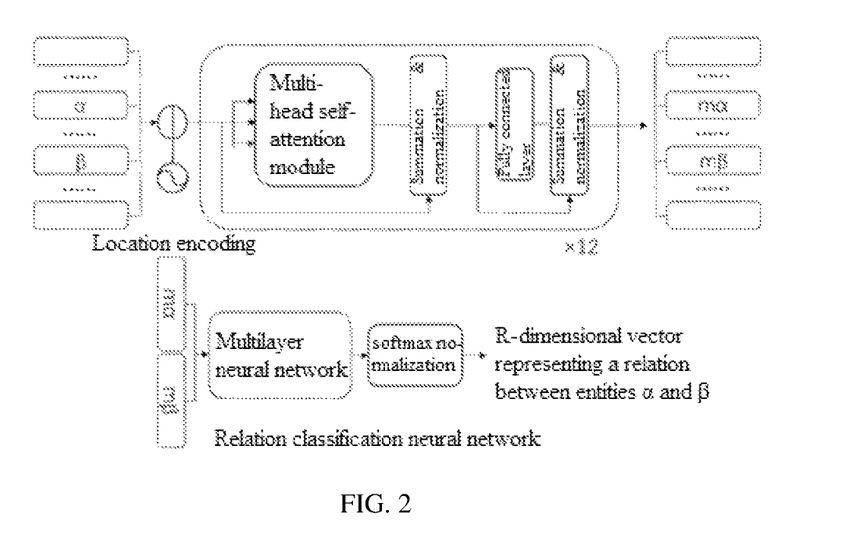
FIG. 2 is a schematic diagram of a relation recognition model according to one or more embodiments.

Referring to FIG. 2, the relation recognition model may include a sub-model of a transformer structure and a relation classification neural network. The sub-model of the transformer structure includes 12 multi-head attention modules. Certainly, the relation recognition model may be of another structure.

Any replaced sentence is first input to the sub-model of the transformer structure, to obtain two feature vectors: $m\alpha$ and $m\beta$. Then, $m\alpha$ and $m\beta$ are input to the relation classification neural network, to obtain M relations and M relation probability values between $\alpha$ and $\beta$. The M relations and the M relation probability values are represented by an M-dimensional relation vector. Each element in the vector is a relation probability value. $\alpha$ and $\beta$ are different identifiers for replacing two adjacent entities. Therefore, the M relations and the M relation probability values between $\alpha$ and $\beta$ are M relations and M relation probability values between the two adjacent entities that are replaced.

Adjacent entities may be replaced with $\alpha$ and $\beta$ with reference to the following example. It is assumed that the sentence to be recognized is "Company A managed by Xiaoming runs a clothing business". Two entity groups may be determined accordingly: "小明+A公司 (Xiaoming+Company A)" and "公司+服装业务 (Company A+clothing business)". Therefore, two new sentences may be obtained: (1) $\alpha$ 管理的 $\beta$ 经 营着服装业务网 ($\beta$ managed by $\alpha$ runs a clothing business); and (2) 小明管理的 $\alpha$ 经营着 $\beta$ ($\alpha$ managed by Xiaoming runs $\beta$).

It should be noted that an M-dimensional relation vector calculated for the new sentence (1) represents a relation between "小明 (Xiaoming)" and "A 公司 (Company A)". If a clause "α 有 β (β is in α)" is obtained based on a sentence "A 公司有小明 (Xiaoming is in Company A)", an M-dimensional relation vector calculated for the clause "α 有 β (β is in α)" represents a relation between "A 公司 (Company A)" and "小明 (Xiaoming)". It can be learned that after the two adjacent entities are transposed, relation recognition needs to be performed again with the relation recognition model.

It should be noted that when a relation between two entities is presented as 0 in the tensor, there may be the following two cases: (1) there is no relation between the two entities; and (1) there is the relation between the two entities but the relation is missing. To determine such cases, in the present application, after the tensor including 0 and 1 is obtained, the currently obtained tensor including 0 and 1 is further optimized.

In an implementation, the currently obtained tensor is optimized to obtain the N×N×M-dimensional tensor includes: the currently obtained tensor is used to form an initial three-dimensional matrix, and the initial three-dimensional matrix is decomposed into M pieces of N×N-dimensional matrices $X_i$, where i=1, 2, ..., M. A d×d×M-dimensional tensor O through initialization is decomposed into M pieces of d×d-dimensional matrices $O_i$, where d represents an adjustable hyper-parameter. An N×d-dimensional matrix A is obtained through initialization, and optimal A' and M pieces of optimal $O_i'$ are calculated based on $X_i=AO_iA^T$ and a gradient descent method. A new three-dimensional matrix is obtained based on the optimal A' and the M pieces of optimal $O_i'$. The initial three-dimensional matrix is compared with the new three-dimensional matrix bit by bit based on a max function, and a maximum value at each location is reserved, to obtain the N×N×M-dimensional tensor.

Generally, matrix transformation may be performed by a matrix decomposition method. Because the tensor in the present application is an N×N×M-dimensional matrix, the N×N×M-dimensional tensor needs to be first decomposed into M pieces of N×N-dimensional matrices: $X_1 \ldots X_i \ldots X_M$, and the d×d×M-dimensional tensor O obtained through initialization is simultaneously decomposed into M pieces of d×d-dimensional matrices: $O_1 \ldots O_i \ldots O_M$. In this way, each $X_i$ may be decomposed into $AO_iA^T$, that is, $X_1=AO_1A^T$, $X_2=AO_2A^T$, ..., and $X_M=AO_MA^T$. Therefore, the optimal A' and the M pieces of optimal $O_i'$ may be calculated based on the gradient descent method, that is, optimal A' and optimal $O_i'$ in the foregoing M pieces of equations are calculated. Then, $X'_1=A'O_1A'^T$, $X'_2=A'O_2A'^T$, ..., and $X'_M=A'O_MA'^T$ are calculated to obtain M pieces of calculation results: $X'_1 \ldots X'_i \ldots X'_M$. The M pieces of calculation results may be spliced to obtain the new three-dimensional matrix. $A'^T$ is a transposed matrix of A'. Certainly, if M pieces of optimal $O_i'$ is obtained: $O'_1 \ldots O'_i \ldots O'_M$, $O'_1 \ldots O'_i \ldots O'_M$ may be spliced to obtain a new d×d×M-dimensional tensor O, and the new three-dimensional matrix may be obtained based on $X=AOA^T$.

Then, elements in the initial three-dimensional matrix and the new three-dimensional matrix are compared bit by bit, and the maximum value at each location is reserved, to obtain the N×N×M-dimensional tensor. For example, for a location, an element in the initial three-dimensional matrix is 0, and an element in the new three-dimensional matrix is 0.02. In this case, an element at the location in X" is denoted as 0.02. For another example, for a location, an element in the initial three-dimensional matrix is 1, and an element in the new three-dimensional matrix is 0.99. In this case, an element at the location in X" is denoted as 1.

In an implementation, the extended information is determined for the entity includes: the entity is used as a target object, and an object entity in maximum correlation with the target object is determined in the preset entity set. The object entity is another entity in the preset entity set except the entity. Extended information of the target object is generated based on the object entity in maximum correlation with the target object.

In an implementation, the object entity in maximum correlation with the target object is determined in the preset entity set includes: a maximum relation probability value of the target object relative to each object entity is determined, to obtain N-1 pieces of maximum relation probability values. N-1 represents a quantity of object entities. N represents a quantity of entities included in the preset entity set. A correlation between each object entity and the target sentence is determined, to obtain N-1 pieces of correlations. For each object entity, a product of the correlation corresponding to the object entity and the maximum relation probability value corresponding to the object entity is calculated, to obtain a correlation score corresponding to the object entity to obtain N-1 pieces of correlation scores. An object entity corresponding to a maximum correlation score in the N-1 pieces of correlation scores is used as the object entity in maximum correlation with the target object.

If the preset entity set includes N pieces of entities, where N is a positive integer, when any entity W in the target sentence is present in the preset entity set, one maximum relation probability value of the entity W relative to each of the other N-1 pieces of second entities in the preset entity set may be determined, to obtain N-1 pieces of maximum relation probability values.

Because a relation between different entities is represented by an M-dimensional vector, the M-dimensional vector includes M pieces of relation probability values. In this embodiment, a maximum value in the M pieces of relation probability values is determined as a maximum relation probability value between the any entity W in the target sentence and another entity in the preset entity set.

In addition, one correlation between each of the N-1 pieces of entities in the preset entity set other than the entity W and the target sentence may be calculated, so that N-1 pieces of correlations are obtained.

Therefore, any one of the N-1 pieces of entities corresponds to one correlation and one maximum relation probability value, and a product of the correlation and the maximum relation probability value may be calculated to obtain a correlation score. Because there are N-1 pieces of entities, N-1 pieces of correlation scores may be obtained. An entity corresponding to the maximum correlation score in the N-1 pieces of correlation scores is an entity that is in maximum correlation with the entity W and also in maximum correlation with the target sentence, and thus is used as an entity in maximum correlation with the entity W. Extended information generated based on the entity in maximum correlation with the entity W may be regarded as effective and accurate extended information of the entity W. Therefore, information extension precision and accuracy can be improved, and ineffective and inaccurate extended information can be avoided.

In an implementation, the correlation between each object entity and the target sentence is determined includes: for each object entity, a sum of a correlation degree between each entity in the target sentence and the object entity is determined as the correlation between the object entity and the target sentence.

A correlation degree between any entity in the target sentence and any object entity is a maximum relation probability value of the any entity in the target sentence relative to the object entity plus a maximum relation probability value of the object entity relative to the entity.

If the target sentence includes three entities: A, B, and C, a correlation between the target sentence and any object entity F is a sum of a correlation degree between A and F, a correlation degree between B and F, and a correlation degree between C and F. The calculated sum needs to be normalized. The correlation degree between A and F is a maximum relation probability value of A relative to F plus a maximum relation probability value of F relative to A. The correlation degree between B and F is a maximum relation probability value of B relative to F plus a maximum relation probability value of F relative to B. The correlation degree between C and F is a maximum relation probability value of C relative to F plus a maximum relation probability value of F relative to C. It can be learned that a correlation degree between any two entities is calculated by finding two maximum relation probability values related to the two entities from the tensor, then summing the two maximum relation probability values, and performing normalization.

A value in each dimension in an M-dimensional relation vector ranges from 0 to 1. Each value represents a probability of a corresponding relation. A sum of values in all dimensions is 1.

For a sentence T to be input to the BERT model for a natural language processing task, some information in the knowledge graph is inserted into the sentence T. Then, how to select, from the knowledge graph, information required to be inserted? A correlation degree between entities and a correlation between an entity in the information to be inserted and the sentence are calculated, to assess a value of the information to be inserted for the sentence, and information with a maximum value is selected for insertion.

(1) A correlation degree between any two entities in an entity table E is calculated.

The knowledge graph (the tensor X") represents a probability that there is a relation in a relation table G between any two entities in the entity table E, the correlation degree between the two entities is measured by a sum of probabilities that there is a maximum relation in the relation table G between the two entities, and a correlation degree score is obtained through softmax normalization. For example, for an $i^{th}$ entity $e_i$ and a $j^{th}$ entity $e_j$ in the entity table E, a correlation degree score of the two entities is:

$$S(i, j) = \frac{e^{\left(\sum_{k=1}^{M}(X_{ijk}+X_{jik})\right)}}{\sum_{j=1}^{N} e^{\left(\sum_{k=1}^{M}(X_{ijk}+X_{jik})\right)}}$$

It is considered that there is more relations between two entities, a correlation between the two entities is higher. $X_{ijk}$ corresponds to a probability value that there is a $k^{th}$ relation $r_k$ in the relation table G between the $j^{th}$ entity $e_j$ and the $i^{th}$ entity $e_i$ in the entity table E.

(2) A correlation score between the entity in the information to be inserted and the sentence is calculated.

It is considered that if correlation degrees between all entities in a sentence and an entity in the entity table are higher, a correlation between the sentence and the entity is higher. Therefore, a correlation score between the sentence and the entity is calculated based on the correlation degree between the entities obtained above.

It is assumed that the sentence T intersects p entities $e_{t1}, \ldots, e_{tp}$ in the entity table E in total. In this case, a correlation between the sentence T and the entity e; in the entity table E is measured by a normalization result of a sum of correlation degrees between the entities $e_{t1}, \ldots, e_{tp}$ and the entity $e_i$, that is, a correlation degree score between T and $e_i$ is:

$$Y(i, T) = \frac{e^{\left(\sum_{i=1}^{p} s(i, t_j)\right)}}{\sum_{k=1}^{N} e^{\left(\sum_{i=1}^{p} s(i,t_j)\right)}}$$

N represents a quantity of entities included in the entity table E, and p represents a quantity of entities included in the entity table E and the sentence T.

(3) The information (relation between entities) to be inserted into the sentence T is selected below based on a correlation score function Y and the knowledge graph (the tensor X"). The information represents knowledge that there is a relation between two entities. For example, "there is the relation $r_k$ between the entity e; and the entity $e_j$" is a piece of information. The value of the information for a sentence is in positive correlation with a probability of presence of the information and a correlation between the information and the sentence.

The sentence T is traversed word by word, to find totally p pieces of entities $e_{t1}, \ldots, e_{tp}$ that are present in both the sentence T and the entity table E, corresponding to $(t1)^{th}, \ldots, (tp)^{th}$ entities in the entity table E. Then, correlation scores $Y(1, T), \ldots, Y(N, T)$ between the sentence T and entities in the entity table are calculated based on the correlation score function Y.

Then, supplementary information is selected for each of the entities $e_{t1}, \ldots, e_{tp}$ in the sentence T. The supplementary information is selected by the following method: for an entity $e_q$ (q=∈{t1, ..., tp}) in $e_{t1}, \ldots, e_{tp}$, obtaining, from the tensor X", probabilities $X_{qi1}, \ldots, X_{qiM}$ that there are respectively the M pieces of relations in the relation table G between the entity $e_q$ and any other entity $e_i$ (i≠q) in the entity table. A maximum value in the M pieces of relation probabilities between the entity $e_q$ and the entity $e_i$ (i≠q) is calculated, to obtain a maximum relation probability between $e_q$ and $e_i$.

The foregoing operations may be performed on all of N-1 pieces of entities different from $e_q$ in the entity table E, to obtain N-1 pieces of maximum relation probabilities of $e_q$.

It is assumed that the N-1 pieces of relation probabilities are that there is a $(k_1)^{th}$ relation $r_{k1}$ in the relation table G between $e_q$ and $e_{j1}$, there is a $(k_2)^{th}$ relation $r_{k2}$ in the relation table G between $e_q$ and $e_j2, \ldots$, and there is an $(N-1)^{th}$ relation $r_{kN-1}$ between $e_q$ and $e_{jN-1}$, where $e_{ji}, \ldots, e_{jN-1}$ are entities in the entity table E other than $e_q$. In this case, the N-1 pieces of maximum relation probabilities are $X_{gj_1K_1}, \ldots, X_{qj_{N-1}K_{N-1}}$.

Then, the N-1 pieces of maximum relation probabilities are multiplied by the correlation score between T and $e_i$, to obtain N-1 pieces of information assessed values. An entity and information (relation between entities) that correspond to a maximum value in the N-1 pieces of information assessed values are selected to perform information insertion after $e_q$. The determined entity and information are converted into a word through the entity table E, the relation table G, and a word table W, and the word is inserted after a location of the entity $e_q$ in the sentence.

The N-1 pieces of information assessed values may be:

$$V_1 = Y(j_1, T) * X_{qj_1 k_1},$$
$$V_2 = Y(j_2, T) * X_{qj_2 k_2}, \ldots,$$
$$V_{N-1} = Y(j_{N-1}, T) * X_{qj_{N-1} k_{N-1}}.$$

$V_1$ to $V_{N-1}$ are values of corresponding entities and information for the sentence T.

The entities $e_{t1}, \ldots, e_{tp}$ in T are traversed one by one, and information is inserted for each entity based on the foregoing steps, to finally obtain an information-extended sentence. The BERT model may process the information-extended sentence to obtain better processing effects.

In this embodiment, when the information to be inserted (relation between entities) is selected from the knowledge graph, the value of the information to be inserted for the sentence (reflected as a correlation between the information and the sentence and the credibility of the information) is fully considered. This ensures quality of the information to be inserted and reduces introduction of noise.

In an implementation, the maximum relation probability value of the target object relative to each object entity is determined includes: an N×N×M-dimensional tensor for representing a relation and a relation probability value between entities in the preset entity set is generated. M represents a quantity of dimensions of a relation vector between different entities in the preset entity set. A knowledge graph is generated based on the N×N×M-dimensional tensor, and the maximum relation probability value of the target object relative to each object entity is queried in the knowledge graph. It can be learned that a maximum relation probability value of each entity relative to each object entity can be obtained through query in the knowledge graph. The knowledge graph is generated based on the N×N×M-dimensional tensor. For a generation process of the N×N×M-dimensional tensor, reference may be made to foregoing related descriptions.

In an implementation, in the process in which the BERT model performs the natural language processing task, an attention score between extended information of any entity in the target sentence and the entity is tuned to a target value. The target value is a sum of the attention score between the extended information and the entity and In Y. Therefore, impact of the added information on the original sentence is adjusted based on a relation probability value in the knowledge graph. Y represents a value at a corresponding location in the N×N×M-dimensional tensor. The N×N×M-dimensional tensor is used to represent the relation and the relation probability value between the entities in the preset entity set.

Figure 3:
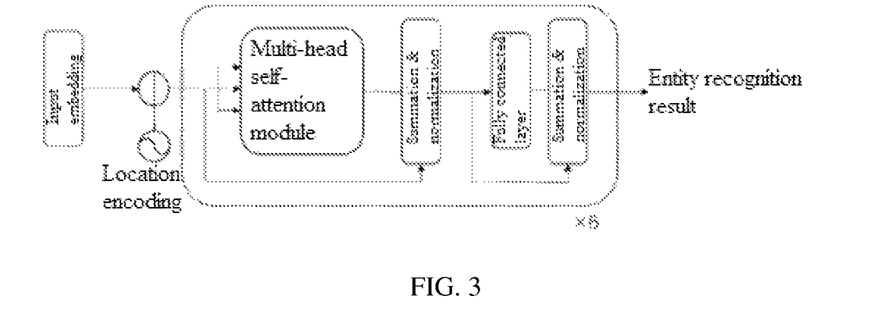
FIG. 3 is a schematic diagram of an entity recognition model according to one or more embodiments.

In an implementation, each entity in the target sentence is determined includes: each word in the target sentence is converted into a 1024-dimensional vector, to obtain a vector set. The vector set is input to an entity recognition model, such that the entity recognition model recognizes each entity in the target sentence.

For the entity recognition model, referring to FIG. 3, the entity recognition model shown in FIG. 3 is implemented based on a transformer, and includes six multi-head self-attention modules. Certainly, the entity recognition model may be implemented based on another structure. "Location encoding" in FIG. 2 and FIG. 3 is used to record a location of each word in a sentence.

For a sentence "北京是中国的首都 (Beijing is the capital of China)", a recognition result output by the entity recognition model may be: 北京是中国的首都 (AABAABBB), where A represents an entity, and B represents a non-entity.

In the following embodiment, professional knowledge in a knowledge graph is added to input data of a BERT model through steps of data preparation, entity recognition, relation recognition, knowledge graph construction, information embedding, and attention score adjustment, and an attention score is adjusted, so that accuracy of the BERT model in a natural language processing task is improved.

1. Data Preparation

A sentence library including numerous sentences is constructed. A word table W including all words is constructed for all texts in the sentence library. In addition, the word table W further includes two special identifiers a and B. The word table W may be used to determine a relational word between two entities.

2. Entity Recognition

A model capable of performing entity recognition on a text is constructed, to obtain an entity recognition model. The entity recognition model may be as shown in FIG. 3. A sentence is randomly extracted from the sentence library, and manual annotation is performed to obtain a training text. A model is trained with the manually annotated text to obtain the entity recognition model. For a training process, it can refer to the related art. Details are not described herein again.

Each word included in the word table W is converted into a Z-dimensional one-hot vector. Then, the Z-dimensional one-hot vector is mapped into a 1024-dimensional vector through a matrix $J \in R^{1024 \times Z}$. R represents a preset real number set. Therefore, each word may be represented by one 1024-dimensional vector.

For a sentence in the sentence library, each word in the sentence is represented by a 1024-dimensional vector, so that a set of 1024-dimensional vectors may be obtained. The set is input to the entity recognition model, to recognize each entity in the sentence.

3. Relation Recognition

An entity in each sentence of the sentence library may be recognized through the entity recognition model. Therefore, for each sentence, a relation between entities in the sentence may be further recognized.

A relation table G including a relation of interest is first constructed. The relation table G includes M pieces of different relations, one of which is defined as irrelevance representing that there is no relation between two entities. The relation table G is customized based on a requirement. Each relation in the relation table corresponds to one M-dimensional one-hot vector. It is specified that a $k^{th}$ relation in the M-dimensional one-hot vector is denoted as $r_k$ and corresponds to a $k^{th}$ dimension of the vector.

Then, two adjacent entities in a sentence are replaced with a and B. A method for replacing an entity in a sentence includes: for a sentence, after all entities in the sentence are determined, replacing two adjacent entities in the sentence in sequence.

The sentence is first traversed word by word. All words corresponding to a first entity in the sentence are replaced with a, and all words corresponding to a second entity in the sentence are replaced with B, to obtain a clause (that is, a new sentence). From the second entity in the sentence, all words corresponding to the second entity in the sentence are replaced with α, and all words corresponding to a third entity are replaced with β, to obtain a second clause. The operations are repeated until all entities in the sentence are replaced. It is assumed that the sentence is "小明管理的 A 公司经营着服装业务 (Company A managed by Xiaoming runs a clothing business)". Two entity groups may be determined accordingly: "小明+A 公司 (Xiaoming+Company A)" and "A 公司+服装业务 (Company A+clothing business)". Therefore, two clauses may be obtained: (1) α 管理的 β 经营着服装业务网 (β managed by α runs a clothing business network); and (2) 小明管理的 α 经营着 β (α managed by Xiaoming runs β).

A relation recognition model is constructed. A small part of sentences are randomly extracted from the sentence library to form a training set. Entity replacement is performed on each sentence. For a sentence including q pieces of entities, q-1 pieces of clauses may be obtained through replacement. For each clause, a relation between α and β is determined based on a meaning of the clause. The corresponding relation is found from the relation table G for manual annotation. A label corresponding to each clause is an M-dimensional one-hot vector representing the relation between α and β. A logits regression loss function training model is minimized by an ADAM algorithm, to obtain the relation recognition model. The relation recognition model may be as shown in FIG. 2. For a training process of the relation recognition model, it can refer to the related art. Details are not described herein again.

Because at least one clause may be obtained for one sentence, each clause is input to the relation recognition model, and a relation between adjacent entities of each group in the sentence may be output. A relation between every two adjacent entities is represented by an M-dimensional vector.

The clause obtained through entity replacement is input to the relation recognition model shown in FIG. 2, and two vectors mα and mβ corresponding to α and β may be output from a transformer. The two vectors are spliced to obtain a vector h=<hα|hβ>. In this case, the vector h includes context information of the two entities. Then, the vector h is input to a relation classification neural network for relation classification. An output layer of the network is a softmax normalization layer, and may output an M-dimensional vector $v=(p_1, p_2, \ldots, p_M)$, where a value in each dimension represents a probability that a relation between α and β in the input clause is a corresponding relation in G.

For example, if the output vector is $(p_1, p_2, \ldots, p_M)$, a first dimension, a second dimension, . . . , and an $M^{th}$ dimension correspond to relations $r_1, r_2, \ldots, r_M$ respectively. In this case, it may be considered that a probability that there is the relation $r_1$ between α and β in the input clause is $p_1$, a probability that there is the relation $r_2$ is $p_2$, . . . , and a probability that there is the relation $r_M$ is $p_M$. Because the relation between the entities is determined by overall semantics of the sentence, and is unrelated to the entities, the relation between α and β is equivalent to a relation between the two entities that are replaced in the original sentence.

4. Knowledge Graph Construction

All entities in the sentence library are recognized by the entity recognition model, and repeated entities are removed, to obtain an entity table E (that is, a preset entity library). The entity library E includes N entities in total. It is specified that $e_i$ is an $i^{th}$ entity in E, where 1≤i≤N.

A relation between two adjacent entities in each sentence is recognized by the relation recognition model, and the knowledge graph is constructed. The knowledge graph is quantitatively represented by an N×N×M-dimensional tensor. It can be learned from the tensor whether there is any relation included in the relation table G between any two entities included in the entity table E. N represents a quantity of entities included in the entity table E. M represents a quantity of relations included in the relation table G. $X_{ijk}$ represents an element at one location in the tensor, and corresponds to two entities in the entity table E and one relation in the relation table G. A correspondence rule is that $X_{ijk}$ represents the $i^{th}$ entity $e_i$ and a $j^{th}$ entity $e_j$ in the entity table E and a $k^{th}$ relation $r_k$ in the relation table G.

A construction process of the knowledge graph includes the following steps.

In (1), an initial N×N×M-dimensional tensor X is constructed. In this case, all values in X are initialized to 0.

In (2), a relation between two adjacent entities in each sentence in the sentence library is recognized by the relation recognition model, to obtain a plurality of M-dimensional vectors. For any M-dimensional vector, a dimension corresponding to a maximum value in the vector is found, and the initial N×N×M-dimensional vector X is updated based on a relation corresponding to the dimension and entities replaced with α and β in a clause.

For example, it is assumed that for a clause, an output M-dimensional relation vector is $v=(p_1, p_2, \ldots, p_M)$, where a value $p_k$ corresponding to the $k^{th}$ dimension is maximum, and the dimension corresponds to the $k^{th}$ relation $r_k$ (1≤k≤M) in the relation table G. It is also assumed that two entities replaced with α and β in the clause correspond to the $i^{th}$ entity $e_i$ and the $j^{th}$ entity $e_j$ (1≤i, j≤N) in the entity table E. In this case, when and only when $p_k$ is greater than a preset value θ (0<θ<1), it is considered that there is the relation $r_k$ between the entities $e_i$ and $e_j$, and $X_{ijk}$ in X is initialized to 1; or when $p_k$ is not greater than a preset value θ, $X_{ijk}$ in X is initialized to 0. The preset value θ is a second threshold.

For all M-dimensional vectors, X is continuously updated accordingly. After all the M-dimensional vectors are processed, finally obtained X is output.

In (3), X finally obtained in (2) is optimized based on tensor decomposition, to supplement the knowledge graph with potential information.

X obtained through (2) is usually sparse. In this step, inference is performed on a potential relation in X through tensor decomposition, to explore the potential relation, so that knowledge (relation between entities) in the knowledge graph is completed.

For X obtained in step (2), if $X_{ijk}=1$ for a point in X, it indicates that there is the $k^{th}$ relation $r_k$ in the relation table G between the $i^{th}$ entity $e_i$ in the entity table E and the $j^{th}$ entity $e_j$ in the entity table; or if $X_{ijk}=0$, it cannot be determined whether there is no such relation or information recording the relation is missing.

Therefore, in this step, a value at a location that is originally 0 in X is inferred through an element that is 1 in X, that is, a probability that there is an undetermined relation is inferred through an existing determined relation. For example, if relations (小明，管理，A 公司) ((Xiaoming, manage, Company A), (小马，管理，B 公司) ((Xiaoma, manage, Company B)), (A 公司，经营，服装业务) ((Company A, run, clothing business), (B 公司，经营，微信) ((Company B, run, WeChat), and (小明，管理，服装业务) ((Xiaoming, manage, clothing business) are known, it may be inferred that a probability that (小马，管理，微信) ((Xiaoma, manage, WeChat)) is true is high, and the knowledge graph may be supplemented accordingly.

The following describes in detail a method for supplementing X through tensor decomposition, including: decomposing the tensor X into X≈AOA$^T$ (A is an N×d-dimensional matrix, O is a d×d×M-dimensional tensor, d is an adjustable hyper-parameter, and A$^T$ is a transposed matrix of A), updating A and O by a gradient descent method, and after a loss function converges to be small enough, updating X based on a tensor X'=AOA$^T$.

The following implementation steps are included. The tensor X is decomposed into M pieces of N×N-dimensional matrices $X_1, \ldots, X_M$, and the N×d-dimensional matrix A and M pieces of d×d-dimensional tensors $O_1, \ldots, O_M$ are simultaneously constructed, to decompose $X_1, \ldots, X_M$ into $AO_1A^T, \ldots, AO_MA^T$.

After the matrices A and $O_1, \ldots, O_M$ are randomly initialized, the loss function $$L = \sum_{i=1}^{M} \|X_1 - AO_iA^T\|_F^2 + \lambda \left( \|A\|_F^2 + \sum_{i=1}^{M} \|O_i\|_F^2 \right)$$

is minimized by the gradient descent method, and then there is:

$$\frac{dL}{dA} = -2\sum_{i=1}^{M} \left[ (X - AO_iA^T)AO_i^T + (X - AO_iA^T)^T AO_i \right] + 2\lambda A^T,$$

$$\frac{dL}{dO_i} = -2A^T(X - AO_iA^T)A + 2\lambda O^T.$$

A and $O_1, \ldots, O_M$ are updated accordingly in each cycle:

$$A = A - \eta \frac{dL}{dA}, O_i = O_i - \eta \frac{dL}{dO_i}.$$

η is a learning rate, and i=1, . . . , M.

After the loss function converges to be small enough after a plurality of cycles, optimal A and optimal $O_1, \ldots, O_M$ are obtained, and $O_1, \ldots, O_M$ are spliced to obtain a new tensor O.

Then, the tensor X'=AOA$^T$ is calculated, and values at locations in X' and X are maximized one by one, that is, final $X"_{ijk}$=max$(X_{ijk}', X_{ijk})$. After updated, a value at each point in the tensor X represents a probability that there is a relation corresponding to the point in the relation table G between two entities corresponding to the point in the entity table E, or credibility of information indicating that there is a relation between two entities. For example, $X_{ijk}$ corresponds to the i$^{th}$ entity $e_i$ and the j$^{th}$ entity $e_j$ in the entity table E and the k$^{th}$ relation $r_k$ in the relation table G. In this case, $X_{ijk}$=0.8 indicates that a probability that there is the relation $r_j$ between the entity $e_j$ and the entity $e_j$ is 0.8.

Finally, the knowledge graph is generated based on the finally obtained X".

5. Information Embedding and Attention Score Adjustment

For a sentence T to be input to the BERT model for a natural language processing task, in this step, information in the knowledge graph is inserted into the sentence T, and an attention score is modified to change impact of an inserted word on an original word in the sentence T.

(1) Entity recognition is performed on the input sentence T through the entity recognition model, to obtain all entities u1, . . . , ut in the sentence T. Then, information extension is performed on all the entities in sequence.

For an entity in the sentence, information extension is performed through the following operations.

For an entity u in the sentence T, the entity u is queried in the entity table E. If the entity u is not present in the entity table E, information extension is not performed on the entity; or if the entity u is present in the entity table (it is assumed herein that u is the i$^{th}$ entity $e_i$ in E), search for information about $e_j$ is performed in the knowledge graph, that is, search for a matrix related to $e_i$ is performed in the optimized tensor X".

The optimized X" is sliced, and an N×M-dimensional slice matrix X"$_i$ is extracted. The matrix X"$_i$ represents a probability that there is any relation in the relation table G between the i$^{th}$ entity $e_i$ in the entity table E and any other entity in E.

Search for all points at which values are greater than ψ(0<ψ<1, a specified value, that is, a first threshold) is performed in the matrix X"$_i$.

If s pieces of points $(i, j_1, k_1), \ldots, (i, j_s, k_s)$ in X"$_i$ meet requirements $X"_{ij_1k_1}>\psi, \ldots, X"_{ij_sk_s}>\psi$, it is learned that a probability that there is the relation $r_{k_1}$ between $e_i$ and $e_{j1}$ is $X"_{ij_1k_1}$ and a probability that there is a relation $r_{k_s}$ between $e_i$ and $e_{js}$ is $X"_{ij_sk_s}$.

Then, relation information provided by the s pieces of points is added to the sentence T through the following operation: converting, based on the entity table E, the relation table G, and the word table W, $$r_{k_1, e_{j1}}, \ldots, r_{k_s, e_{js}}$$

into a corresponding word sequence for insertion after a location of the entity u in the sentence T.

The foregoing operations are performed on all the entities u1, . . . , ut in the sentence one by one, to obtain an information-extended sentence T'.

However, directly inputting T' to the BERT model may bring the following adverse impact. (1) An added word is unrelated to some words in the original sentence T, and if two unrelated words affect each other because of a self-attention mechanism, an output may be affected. (2) The added information is not necessarily reliable, and if added unreliable information affects the original input sentence T too much, accuracy of a result may also be affected.

To solve the foregoing adverse impact, a self-attention layer of the BERT model is modified in this embodiment according to the following steps.

In the self-attention layer of the BERT model, InY is added to an attention score between each word in an original entity and each word in added information about the entity, and negative infinity −∞ is added to an attention score between the added information and a word unrelated to the added information in the original sentence.

For example, if the original input sentence is "小明创立 A 公司 (Xiaoming sets up Company A)", a sentence obtained by performing information extension according to the foregoing operations is "小明是中国人创立 A 公司经营服装业务 (Xiaoming is Chinese and sets up Company A running a clothing business)".

It can be learned from the tensor X" that relation credibility of information "小明 是中国人 (Xiaoming is Chinese)" is 1 (that is, an element value at a corresponding location in X"), and relation credibility of "A 公司经营服装业务 (Company A running a clothing business)" is 0.98 (that is, an element value at a corresponding location in X"). In this case, an attention score output by the self-attention layer of the BERT model is modified through the following operations: the self-attention layer calculates an attention score between every two of the 16 words in the sentence. After calculation, In1 is added to an attention score between words of each pair in "小明 (Xiaoming)" and "是中国人 (is Chinese)" (that is, 马 and 是, 云 and 是, 马 and 中, 人 and 中, 马 and 国, 人 and 国, 马 and 人, and 云 and 人)), In0.98 is added to an attention score between words of each pair in "A 公司 (Company A)" and "经营服装 业务 (running a clothing business)", -∞ is added to an attention score between words of each pair in "是中国人 (is Chinese)" and "创立 A 公司 (starts Company A)", and -∞ is added to an attention score between words of each pair in "小明是中国人创立 (Xiaoming is Chinese and sets up)" and "经营着服装业务 (running a clothing business)".

Through the foregoing method of modifying the self-attention layer, impact between unrelated information can be avoided, and impact of the added information on the original sentence is adjusted based on the relation credibility in the knowledge graph, to reduce impact of relation credibility information on the original input. The relation credibility is a relation probability value.

It can be learned that in this embodiment, an entity in a sentence may be recognized based on the entity recognition model, a relation between two adjacent entities in the sentence may be recognized by the relation recognition model, and the knowledge graph is constructed and optimized accordingly, to obtain a tensor representing a relation between any two entities. In addition, the self-attention layer of the BERT model is modified to change the impact of inserted information on the original input sentence and avoid impact between unrelated information.

The following describes a natural language processing apparatus provided in an embodiment of the present application. Reference may be made between the natural language processing apparatus described below and the natural language processing method described above.

Figure 4:
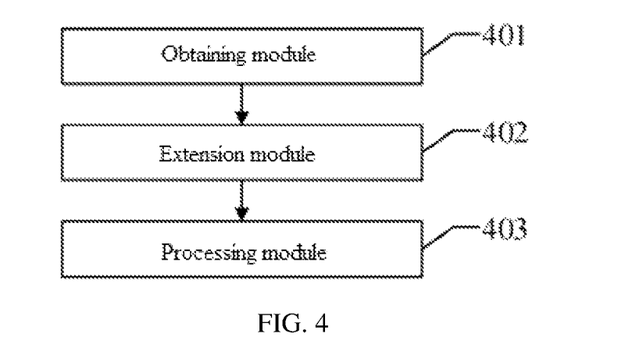
FIG. 4 is a schematic diagram of a natural language processing apparatus according to one or more embodiments.

As shown in FIG. 4, an embodiment of the present application discloses a natural language processing apparatus, including:
an obtaining module 401, configured to obtain a target sentence to be processed, and determine each entity in the target sentence;
an extension module 402, configured to: for each entity in the target sentence, if the entity is present in a preset entity set, determine extended information for the entity, and add the determined extended information after a location of the entity in the target sentence, to obtain an updated target sentence; and
a processing module 403, configured to input the updated target sentence to a BERT model, such that the BERT model performs a natural language processing task, where in a process in which the BERT model performs the natural language processing task, an attention score between extended information of any entity in the target sentence and another entity in the target sentence is tuned to zero.

In some implementations, the extension module 402 is configured to: for each entity in the target sentence, in response to the entity being present in a preset entity set, determine extended information for the entity, and add the determined extended information after a location of the entity in the target sentence, to obtain an updated target sentence.

In an implementation, the extension module includes:
a first determining unit, configured to use the entity as a target object, and determine, in the preset entity set, an entity group in relation with the target object; and
a selection unit, configured to select, from the entity group, an entity corresponding to a relation probability value greater than a first threshold, and generate extended information of the target object based on the selected entity.

In an implementation, the first determining unit includes:
a generation subunit, configured to generate an N×N×M-dimensional tensor for representing a relation and a relation probability value between entities in the preset entity set, where N represents a quantity of entities included in the preset entity set, and M represents a quantity of relations between different entities in the preset entity set; and
a query subunit, configured to generate a knowledge graph based on the N×N×M-dimensional tensor, and query, in the knowledge graph, the entity group in relation with the target object.

In an implementation, the generation subunit is configured to:
generate an initial tensor that is all-0 in N×N×M dimensions;
obtain a sentence library for generating the preset entity set, traverse each sentence in the sentence library, and use the traversed sentence as a sentence to be recognized;
use two adjacent entities in the sentence to be recognized as an entity group, to obtain a plurality of entity groups;
recognize a relation between two entities in each entity group by using a relation recognition model, to obtain a plurality of M-dimensional relation vectors;
for each M-dimensional relation vector, if a maximum value in any M-dimensional relation vector is greater than a second threshold, update an element at a location, in the initial tensor, which corresponds to the maximum value, from 0 to 1, to update the initial tensor; and
traverse a next sentence in the sentence library, continue to update a current tensor, and after each sentence in the sentence library is traversed, output and optimize a currently obtained tensor to obtain the N×N×M-dimensional tensor.

In an implementation, the generation subunit is configured to:
for two entities in any entity group, replace the two entities in the sentence to be recognized with different identifiers, and input a replaced sentence to the relation recognition model, such that the relation recognition model outputs an M-dimensional relation vector corresponding to the two entities.

In some implementations, the generation subunit updates, for each M-dimensional relation vector, in response to a maximum value in any M-dimensional relation vector being greater than a preset threshold, an element at a location, in the initial tensor, which corresponds to the maximum value, from 0 to 1, to update the initial tensor.

In an implementation, the generation subunit is configured to:
use the currently obtained tensor as an initial three-dimensional matrix, and decompose the initial three-dimensional matrix into M pieces of N×N-dimensional matrices $X_i$, where i=1, 2, . . . , M;

decompose a d×d×M-dimensional tensor O obtained through initialization into M pieces of d×d-dimensional matrices $O_i$, where d is an adjustable hyper-parameter;

obtain an N×d-dimensional matrix A through initialization, and calculate optimal A' and M pieces of optimal $O_i'$ based on $X_i=AO_iA^T$ and a gradient descent method;

obtain a new three-dimensional matrix based on the optimal A' and the M pieces of optimal $O_i'$; and compare the initial three-dimensional matrix with the new three-dimensional matrix bit by bit based on a max function, and reserve a maximum value at each location, to obtain the N×N×M-dimensional tensor.

In an implementation, the extension module includes:

a second determining unit, configured to use the entity as a target object, and determine, in the preset entity set, an object entity in maximum correlation with the target object, where the object entity is another entity in the preset entity set except the entity; and a generation unit, configured to generate extended information of the target object based on the object entity in maximum correlation with the target object.

In an implementation, the second determining unit includes:

a first determining subunit, configured to determine a maximum relation probability value of the target object relative to each object entity, to obtain N-1 pieces of maximum relation probability values, where N-1 represents a quantity of object entities, and N represents a quantity of entities included in the preset entity set;

a second determining subunit, configured to determine a correlation between each object entity and the target sentence, to obtain N-1 pieces of correlations;

a calculation subunit, configured to: for each object entity, calculate a product of the correlation corresponding to the object entity and the maximum relation probability value corresponding to the object entity, to obtain a correlation score corresponding to the object entity to obtain N-1 pieces of correlation scores; and a selection subunit, configured to use an object entity corresponding to a maximum correlation score in the N-1 pieces of correlation scores as the object entity in maximum correlation with the target object.

In an implementation, the second determining subunit is configured to:

for each object entity, determine a sum of a correlation degree between each entity in the target sentence and the object entity as the correlation between the object entity and the target sentence.

In an implementation, a correlation degree between any entity in the target sentence and any object entity is a maximum relation probability value of the any entity in the target sentence relative to the object entity plus a maximum relation probability value of the object entity relative to the entity.

In an implementation, in the process in which the BERT model performs the natural language processing task, an attention score between extended information of any entity in the target sentence and the entity is tuned to a target value. The target value is a sum of the attention score between the extended information and the entity and InY. Y represents a value at a corresponding location in the N×N×M-dimensional tensor. The N×N×M-dimensional tensor is used to represent the relation and the relation probability value between the entities in the preset entity set.

For the working process of each module and unit in this embodiment, it can refer to the corresponding content disclosed in the foregoing embodiment. Details are not described herein again.

It can be learned that this embodiment provides the natural language processing apparatus capable of avoiding impact between unrelated information, to effectively reduce adverse impact of extended information on original input data, improve processing accuracy of the BERT model in the natural language processing task, and improve processing efficiency and processing effects of the BERT model.

The following describes an electronic device provided in an embodiment of the present application. Reference may be made between the electronic device described below and the natural language processing method described above.

Figure 5:
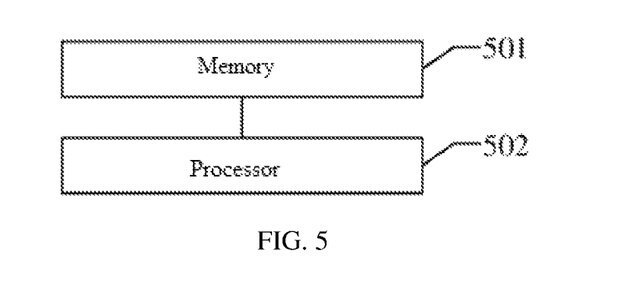
FIG. 5 is a schematic diagram of an electronic device according to one or more embodiments.

As shown in FIG. 5, an embodiment of the present application discloses an electronic device, including:

a memory 501, configured to store computer-readable instructions; and a processor 502, configured to execute the computer-readable instructions, to implement the method disclosed in any foregoing embodiment.

An embodiment of the present application provides one or more non-volatile computer-readable storage media storing computer-readable instructions. Reference may be made between the one or more non-volatile computer-readable storage medium storing the computer-readable instructions described below and the natural language processing method and apparatus and the device that are described above.

According to the one or more non-volatile computer-readable storage media storing the computer-readable instructions, when the computer-readable instructions are executed by one or more processors, the one or more processors are enabled to perform the steps of the natural language processing method according to any foregoing embodiment. For steps of the method, it can refer to the corresponding content disclosed in the foregoing embodiment. Details are not described herein again.

Terms "first", "second", "third", "fourth", and the like (if existing) involved in the present application are intended to distinguish between similar objects but do not necessarily indicate an order or sequence. It should be understood that data termed in such a way are interchangeable in proper circumstances, so that the embodiments described herein can be implemented in orders other than content illustrated or described herein. In addition, terms "include" and "have" and any variants thereof are intended to cover a non-exclusive inclusion. For example, a process, method, or device that includes a list of steps or units is not necessarily limited to those expressly listed steps or units, but may include other steps or units not expressly listed or inherent to such a process, method, or device.

It should be noted that descriptions involving "first", "second", and the like in the present application are used merely for descriptive purposes, and cannot be understood as indicating or implying relative importance or implicitly indicating the quantity of indicated technical features. Therefore, a feature defined by "first" or "second" may explicitly or implicitly include at least one such feature. In addition, technical solutions in various embodiments may be combined with each other, provided that they can be implemented by a person of ordinary skill in the art. When a combination of the technical solutions is contradictory or cannot be implemented, it should be considered that such a combination of the technical solutions neither exists, nor falls within the protection scope claimed by the present application.

Each embodiment in the description is described progressively. Descriptions made in each embodiment focus on differences from the other embodiments, and the same or similar parts in each embodiment refer to the other embodiments.

The steps of the method or algorithm described with reference to the embodiments disclosed in this specification may be directly implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc ROM (CD-ROM), or any other form of storage medium known in the art.

The principle and implementations of the present application are described with examples herein. The above descriptions about the embodiments are only used to help understand the method of the present application and the core concept thereof. In addition, those ordinarily skilled in the art may make variations to the implementations and the application scope according to the concept of the present application. In summary, the content of the description should not be understood as a limitation on the present application.

What is claimed is:

1. A natural language processing method, comprising:
   obtaining a target sentence of a natural language question-answering task to be processed, and determining each entity in the target sentence of the natural language question-answering task, wherein each entity is a noun in the target sentence of the natural language question-answering task;
     for each entity in the target sentence of the natural language question-answering task, in response to the entity being present in a preset entity set, determining extended information for the entity, and adding the extended information after a location of the entity in the target sentence of the natural language question-answering task, to obtain an updated target sentence of the natural language question-answering task, wherein the preset entity set is a collection of nouns, and the updated target sentence of the natural language question-answering task contains the target sentence of the natural language question-answering task and the extended information; and
   inputting the updated target sentence of the natural language question-answering task to a bidirectional encoder representation from transformer (BERT) model, such that the BERT model performs a natural language processing task, wherein the BERT model identifies the entity and the extended information and outputs a best answer to the natural language question-answering task;
   wherein the BERT model performing the natural language processing task comprises:
     modifying a self-attention mechanism of a self-attention layer of the BERT model by adding In Y to an attention score between each word in each entity and each word in added information related to each entity and adding negative infinity ($-\infty$) to an attention score between the added information and a word unrelated to the added information in each entity, wherein Y represents a value at a corresponding location in an N×N×M-dimensional tensor, the N×N×M-dimensional tensor is used to represent a relation and a relation probability value between the entities in the preset entity set, N represents a quantity of entities comprised in the preset entity set, and M represents a quantity of relations between different entities in the preset entity set;
   wherein the determining each entity in the target sentence of the natural language question-answering task comprises:
     converting each word in the target sentence of the natural language question-answering task into a 1024-dimensional vector, to obtain a vector set; and
     inputting the vector set to an entity recognition model, such that the entity recognition model recognizes each entity in the target sentence of the natural language question-answering task, wherein the entity recognition model comprises a transformer, and the transformer comprises six multi-head self-attention modules;
   wherein the determining the extended information for the entity comprises:
     taking the entity as a target object, and determining, in the preset entity set, an object entity in maximum correlation with the target object, wherein the object entity is another entity in the preset entity set except the target object; and
     generating extended information of the target object based on the object entity in maximum correlation with the target object.

2. The method according to claim 1, wherein the determining the extended information for the entity comprises:
   taking the entity as the target object, and determining, in the preset entity set, an entity group in relation with the target object; and
   selecting, from the entity group, an entity which has a relation probability value greater than a first threshold, and generating the extended information of the target object based on the selected entity.

3. The method according to claim 2, wherein the determining, in the preset entity set, the entity group in relation with the target object comprises:
   generating the N×N×M-dimensional tensor for representing the relation and the relation probability value between the entities in the preset entity set; and
   generating a knowledge graph based on the N×N×M-dimensional tensor, and querying, in the knowledge graph, the entity group in relation with the target object.

4. The method according to claim 3, wherein the generating the N×N×M-dimensional tensor for representing the relation and the relation probability value between the entities in the preset entity set comprises:
   generating an initial tensor that is all-0 in N×N×M dimensions;
   obtaining a sentence library for generating the preset entity set, traversing each sentence in the sentence library, and taking the traversed sentence as a sentence to be recognized;
   taking two adjacent entities in the sentence to be recognized as an entity group, to obtain a plurality of entity groups;
   recognizing the relation between two entities in each entity group by using a relation recognition model, to obtain a plurality of M-dimensional relation vectors;
   for each of the plurality of M-dimensional relation vectors, in response to a maximum value in any of the plurality of M-dimensional relation vectors being greater than a second threshold, updating an element at a location, in the initial tensor, which corresponds to the maximum value, from 0 to 1, to update the initial tensor; and traversing and updating a next sentence in the sentence library, and after each sentence in the sentence library is traversed, outputting and optimizing a currently obtained tensor to obtain the N×N×M-dimensional tensor.

5. The method according to claim 4, wherein the recognizing the relation between two entities in each entity group by using the relation recognition model, to obtain the plurality of M-dimensional relation vectors comprises:

for two entities in any entity group, replacing the two entities in the sentence to be recognized with different identifiers to obtain a replaced sentence, and inputting the replaced sentence to the relation recognition model, such that the relation recognition model outputs an M-dimensional relation vector corresponding to the two entities.

6. The method according to claim 5, wherein the optimizing the currently obtained tensor to obtain the N×N×M-dimensional tensor comprises:

forming an initial three-dimensional matrix with the currently obtained tensor, and decomposing the initial three-dimensional matrix into M pieces of N×N-dimensional matrices $X_i$, wherein i=1, 2, ..., M;

decomposing a d×d×M-dimensional tensor O through initialization into M pieces of d×d-dimensional matrices $O_i$, wherein d represents an adjustable hyper-parameter;

obtaining an N×d-dimensional matrix A through initialization, and calculating optimal A' and M pieces of optimal $O_i'$ based on $X_i = AO_i A^T$ and a gradient descent method;

obtaining a new three-dimensional matrix based on the optimal A' and the M pieces of optimal $O_i'$; and comparing the initial three-dimensional matrix with the new three-dimensional matrix bit by bit based on a max function, and reserving a maximum value at each location, to obtain the N×N×M-dimensional tensor.

7. The method according to claim 5, wherein the relation recognition model comprises a sub-model of a transformer structure and a relation classification neural network; and the inputting the replaced sentence to the relation recognition model, such that the relation recognition model outputs the M-dimensional relation vector corresponding to the two entities comprises:

inputting the replaced sentence to the sub-model of the transformer structure, to obtain a feature vector with the identifiers of the two entities; and inputting the feature vector with the identifiers of the two entities to the relation classification neural network, to obtain the M-dimensional relation vector corresponding to the two entities.

8. The method according to claim 1, wherein the determining, in the preset entity set, the object entity in maximum correlation with the target object comprises:

determining a maximum relation probability value of the target object relative to each object entity, to obtain N-1 pieces of maximum relation probability values, wherein N-1 represents a quantity of object entities;

determining a correlation between each object entity and the target sentence, to obtain N-1 pieces of correlations;

for each object entity, calculating a product of the correlation corresponding to the object entity and the maximum relation probability value corresponding to the object entity, to obtain a correlation score corresponding to the object entity to obtain N-1 pieces of correlation scores; and taking an object entity corresponding to a maximum correlation score in the N-1 pieces of correlation scores as the object entity in maximum correlation with the target object.

9. The method according to claim 8, wherein the determining the correlation between each object entity and the target sentence comprises:

for each object entity, determining a sum of a correlation degree between each entity in the target sentence and the object entity as the correlation between the object entity and the target sentence.

10. The method according to claim 9, wherein the correlation degree between the entity in the target sentence and any object entity is a maximum relation probability value of the entity in the target sentence relative to the object entity plus a maximum relation probability value of the object entity relative to the entity.

11. The method according to claim 1, wherein the BERT model comprises the self-attention layer which calculates the attention score between different words in a sentence.

12. An electronic device, comprising:

a memory, configured to store computer-readable instructions; and a processor, configured to execute the computer-readable instructions, and upon execution of the computer-readable instructions, is configured to:

obtain a target sentence of a natural language question-answering task to be processed, and determine each entity in the target sentence of the natural language question-answering task, wherein each entity is a noun in the target sentence of the natural language question-answering task;

for each entity in the target sentence of the natural language question-answering task, in response to the entity being present in a preset entity set, determine extended information for the entity, and add the extended information after a location of the entity in the target sentence of the natural language question-answering task, to obtain an updated target sentence of the natural language question-answering task, wherein the preset entity set is a collection of nouns, and the updated target sentence of the natural language question-answering task contains the target sentence of the natural language question-answering task and the extended information; and input the updated target sentence of the natural language question-answering task to a bidirectional encoder representation from transformer (BERT) model, such that the BERT model performs a natural language processing task, wherein the BERT model identifies the entity and the extended information and outputs a best answer to the natural language question-answering task;

wherein the processor, upon execution of the computer-readable instructions, is further configured to:

modify a self-attention mechanism of a self-attention layer of the BERT model by adding In Y to an attention score between each word in each entity and each word in added information related to each entity and adding negative infinity (−∞) to an attention score between the added information and a word unrelated to the added information in each entity, wherein Y represents a value at a corresponding location in an N×N×M-dimensional tensor, the N×N×M-dimensional tensor is used to represent a relation and a relation probability value between the entities in the preset entity set, N represents a quantity of entities comprised in the preset entity set, and M represents a quantity of relations between different entities in the preset entity set;

wherein the processor, upon execution of the computer-readable instructions, is further configured to:

convert each word in the target sentence of the natural language question-answering task into a 1024-dimensional vector, to obtain a vector set; and input the vector set to an entity recognition model, such that the entity recognition model recognizes each entity in the target sentence of the natural language question-answering task, wherein the entity recognition model comprises a transformer, and the transformer comprises six multi-head self-attention modules:

wherein the processor, upon execution of the computer-readable instructions, is further configured to:

take the entity as a target object, and determining, in the preset entity set, an object entity in maximum correlation with the target object, wherein the object entity is another entity in the preset entity set except the target object; and generate extended information of the target object based on the object entity in maximum correlation with the target object.

13. The electronic device according to claim 12, wherein the processor, upon execution of the computer-readable instructions, is further configured to:

take the entity as the target object, and determine, in the preset entity set, an entity group in relation with the target object; and select, from the entity group, an entity which has a relation probability value greater than a first threshold, and generate the extended information of the target object based on the selected entity.

14. The electronic device according to claim 13, wherein the processor, upon execution of the computer-readable instructions, is further configured to:

generate the N×N×M-dimensional tensor for representing the relation and the relation probability value between the entities in the preset entity set; and generate a knowledge graph based on the N×N×M-dimensional tensor, and query, in the knowledge graph, the entity group in relation with the target object.

15. The electronic device according to claim 14, wherein the processor, upon execution of the computer-readable instructions, is further configured to:

generate an initial tensor that is all-0 in N×N×M dimensions;

obtain a sentence library for generating the preset entity set, traverse each sentence in the sentence library, and take the traversed sentence as a sentence to be recognized;

take two adjacent entities in the sentence to be recognized as an entity group, to obtain a plurality of entity groups;

recognize the relation between two entities in each entity group by using a relation recognition model, to obtain a plurality of M-dimensional relation vectors;

for each of the plurality of M-dimensional relation vectors, in response to a maximum value in any of the plurality of M-dimensional relation vectors being greater than a second threshold, update an element at a location, in the initial tensor, which corresponds to the maximum value, from 0 to 1, to update the initial tensor; and traverse and update a next sentence in the sentence library, and after each sentence in the sentence library is traversed, output and optimize a currently obtained tensor to obtain the N×N×M-dimensional tensor.

16. A non-transitory computer-readable storage media storing computer-readable instructions, wherein the computer-readable instructions, when executed by one or more processors, are configured to cause the one or more processors to:

obtain a target sentence of a natural language question-answering task to be processed, and determine each entity in the target sentence of the natural language question-answering task, wherein each entity is a noun in the target sentence of the natural language question-answering task;

for each entity in the target sentence of the natural language question-answering task, in response to the entity being present in a preset entity set, determine extended information for the entity, and add the extended information after a location of the entity in the target sentence of the natural language question-answering task, to obtain an updated target sentence of the natural language question-answering task, wherein the preset entity set is a collection of nouns, and the updated target sentence of the natural language question-answering task contains the target sentence of the natural language question-answering task and the extended information; and input the updated target sentence of the natural language question-answering task to a bidirectional encoder representation from transformer (BERT) model, such that the BERT model performs a natural language processing task, wherein the BERT model identifies the entity and the extended information and outputs a best answer to the natural language question-answering task;

wherein the computer-readable instructions, when executed by the one or more processors, are configured to cause the one or more processors to:

modify a self-attention mechanism of a self-attention layer of the BERT model by adding In Y to an attention score between each word in each entity and each word in added information related to each entity and adding negative infinity ($-\infty$) to an attention score between the added information and a word unrelated to the added information in each entity, wherein Y represents a value at a corresponding location in an N×N×M-dimensional tensor, the N×N×M-dimensional tensor is used to represent a relation and a relation probability value between the entities in the preset entity set, N represents a quantity of entities comprised in the preset entity set, and M represents a quantity of relations between different entities in the preset entity set;

wherein the computer-readable instructions, when executed by the one or more processors, are configured to cause the one or more processors to:

convert each word in the target sentence of the natural language question-answering task into a 1024-dimensional vector, to obtain a vector set; and input the vector set to an entity recognition model, such that the entity recognition model recognizes each entity in the target sentence of the natural language question-answering task, wherein the entity recognition model comprises a transformer, and the transformer comprises six multi-head self-attention modules;

wherein the computer-readable instructions, when executed by the one or more processors, are configured to cause the one or more processors to:

take the entity as a target object, and determining, in the preset entity set, an object entity in maximum correlation with the target object, wherein the object entity is another entity in the preset entity set except the target object; and generate extended information of the target object based on the object entity in maximum correlation with the target object.

* * * * *